N. WILL.
Gas Burning Furnace.
No. 201,581. Patented March 19, 1878.
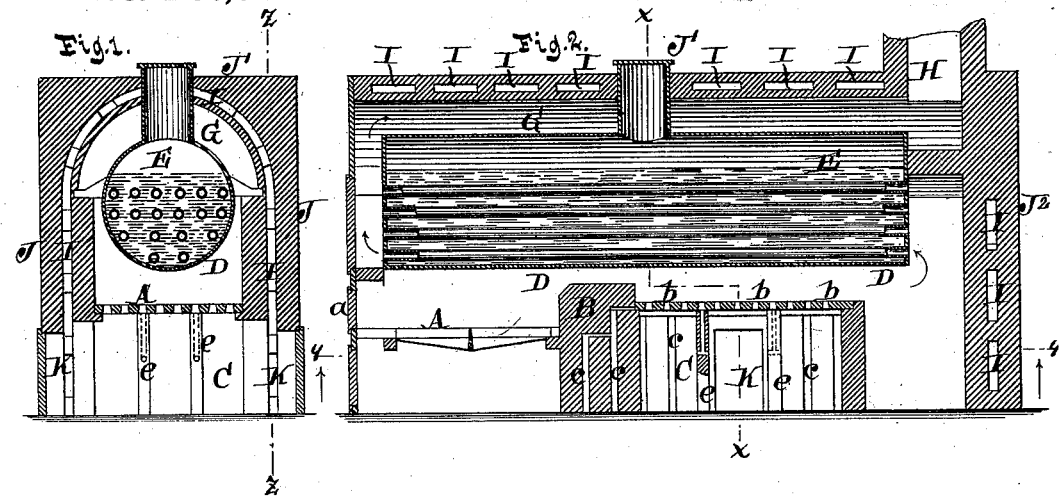
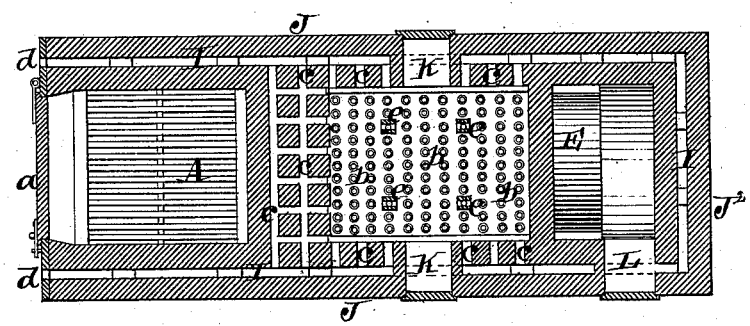
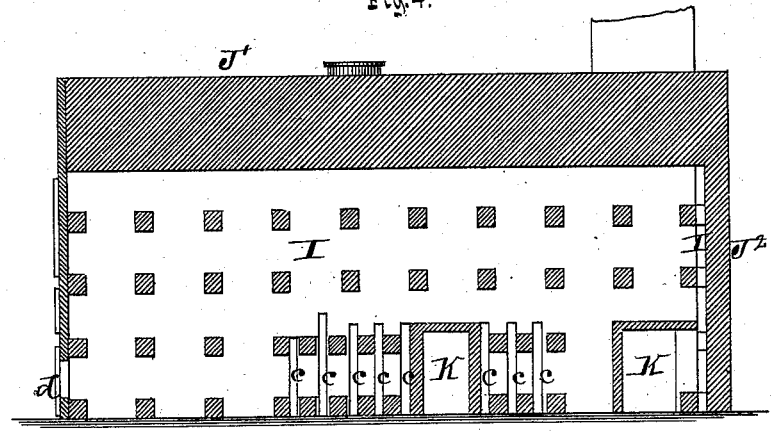
Witnesses.
Otto Hufeland.
Hugo Brueggemann
Inventor.
Nicolaus Will
by
Van Santvoord & Hauff
his attorneys.

UNITED STATES PATENT OFFICE.

NICOLAUS WILL, OF BROOKLYN, NEW YORK.

IMPROVEMENT IN GAS-BURNING FURNACES.

Specification forming part of Letters Patent No. 201,581, dated March 19, 1878; application filed February 20, 1878.

*To all whom it may concern:*

Be it known that I, NICOLAUS WILL, of the city of Brooklyn, in the county of Kings and State of New York, have invented a new and useful Improvement in Gas-Burning Furnaces, which improvement is fully set forth in the following specification, reference being had to the accompanying drawing, in which—

Figure 1 represents a vertical cross-section of my furnace in the line $x\ x$, Fig. 2. Fig. 2 is a central vertical longitudinal section thereof. Fig. 3 is a horizontal section of the same, looking upward, in the line of $y\ y$, Fig. 2. Fig. 4 is a vertical longitudinal section thereof in the line $z\ z$, Fig. 1.

Similar letters indicate corresponding parts.

My invention relates to furnaces for heating steam-boilers, stills, and like articles.

Furnaces of this class have been so constructed as to admit air at a point behind the bridge-wall to the combustion-chamber, for the purpose of burning the unconsumed gases. Air-spaces also have been formed in the furnace-walls, principally to retard the radiation of heat.

The object of my invention is to utilize the air-spaces in the furnace-walls, for the purpose of heating the air which is admitted to the combustion-chamber. To this end it consists in the combination of an air-receiving chamber, which is formed behind the bridge-wall, a perforated tile or plate, which covers said air-receiving chamber, and the perforations of which form a communication between the same and the combustion-chamber, and a series of air-spaces which are formed in the furnace-walls, provided with suitable inlets, and arranged to communicate with each other and with said air-receiving chamber, so that when air is admitted to the air-spaces in the furnace-walls, the same circulates through such spaces, where it is heated, thence passes into the air-receiving chamber, and finally escapes in its heated condition into the combustion-chamber.

In the drawing, the letter A designates the grate of my furnace, to which access is had through a door, $a$, and which is located forward of the bridge-wall B. C is the air-receiving chamber, which is formed behind the bridge-wall B, and the top of which is composed of a tile having a series of perforations, $b$. In the combustion chamber or space D, above the grate, the bridge-wall, and said air-receiving chamber, is arranged a boiler, E, or other apparatus to be heated, the products of combustion being caused to pass through and around this boiler, and thence through a passage, G, to a chimney, H. The letter I designates a series of air-spaces formed in the side walls J J, the top $J^1$, and the rear wall $J^2$ of my furnace. These spaces are arranged to intersect and thus communicate with each other, the spaces in the top being arched, as shown in Fig. 1, to correspond to the shape of the inner surface of said top, while the spaces in the side walls and rear walls are straight. The spaces in the side walls J J communicate with the air-chamber C by means of transverse passages $c$, which are formed in the inner portions of said walls, and are of a height equal, or nearly so, to the height of the air-chamber. Part of these transverse passages $c$ extend directly from the air-spaces in the side walls J J to the air-chamber C, while part thereof also extend through the bridge-wall B, and thence into said air-chamber, a portion of the air passing into the chamber C, thus acquiring additional heat. Air is admitted to the spaces I by inlets $d$, formed at the forward ends of the spaces in the side walls J J, as shown in Figs. 3 and 4. The air thus admitted circulates through the various spaces I, and thus takes up the heat of the top and the walls of the furnace, thence passes into the air-chamber C through the passage $c$, and finally issues from the perforations in the top of this chamber, so that as the products of combustion pass this point the unconsumed gases are burned.

In the air-chamber C are located columns $e$, to assist in supporting the perforated top of this chamber. I make these columns hollow, and provide the same with air-inlets, as shown in Fig. 2, so that if the columns are placed directly under the perforations $b$ the air passes up through the columns and issues from the perforations above them.

Access is had to the air-chamber C, for the purpose of cleaning the same, or for any other purpose, through man-holes K K, and to the rear part of the furnace through a similar hole, L.

It is obvious that the number of these man-holes may be increased, if found expedient.

What I claim as new, and desire to secure by Letters Patent, is—

The combination, in a furnace, of an air-receiving chamber which is formed behind the bridge-wall, a perforated tile or plate which covers said air-receiving chamber, and the perforations of which form a communication between said air-receiving chamber and the combustion-chamber, and a series of air-spaces which are formed in the furnace-walls, provided with suitable inlets, and arranged to communicate with each other and with said air-receiving chamber, substantially as shown and described.

In testimony that I claim the foregoing I have hereunto set my hand and seal this 18th day of February, 1878.

NICOLAUS WILL. [L. S.]

Witnesses:
W. HAUFF,
CHAS. WAHLERS.